United States Patent
Long et al.

(10) Patent No.: US 10,531,212 B2
(45) Date of Patent: Jan. 7, 2020

(54) ACOUSTIC TRANSDUCERS IN HAPTIC SYSTEMS

(71) Applicant: ULTRAHAPTICS IP LTD., Bristol (GB)

(72) Inventors: Benjamin John Oliver Long, Bristol (GB); Thomas Andrew Carter, Bristol (GB); Brian Kappus, San Diego, CA (US)

(73) Assignee: Ultrahaptics IP Ltd., Bristol (GB)

( * ) Notice: Subject to any disclaimer, the term of this patent is extended or adjusted under 35 U.S.C. 154(b) by 0 days.

(21) Appl. No.: 15/623,516

(22) Filed: Jun. 15, 2017

(65) Prior Publication Data

US 2017/0366908 A1    Dec. 21, 2017

Related U.S. Application Data (60) Provisional application No. 62/351,621, filed on Jun. 17, 2016, provisional application No. 62/370,955, filed on Aug. 4, 2016.

(51) Int. Cl.
*H04R 29/00* (2006.01)
*H04R 1/40* (2006.01)
(Continued)

(52) U.S. Cl.
CPC .......... *H04R 29/002* (2013.01); *G06F 3/016* (2013.01); *H04R 1/403* (2013.01); *H04R 1/406* (2013.01);
(Continued)

(58) Field of Classification Search
USPC ..... 381/17, 26, 59, 71.7, 152, 300, 302, 309
See application file for complete search history.

(56) References Cited

U.S. PATENT DOCUMENTS

| 4,218,921 A | 8/1980 | Oran et al. |
| 4,771,205 A | 9/1988 | Mequio |

(Continued)

FOREIGN PATENT DOCUMENTS

| CN | 102591512 | 7/2012 |
| CN | 103797379 | 5/2014 |

(Continued)

OTHER PUBLICATIONS

Pompei, F.J. (2002), "Sound from Ultrasound: The Parametric Array as an Audible Sound Source", Massachusetts Institute of Technology.

(Continued)

*Primary Examiner* — Yosef K Laekemariam
(74) *Attorney, Agent, or Firm* — Koffsky Schwalb LLC; Mark I. Koffsky (57) ABSTRACT

Described is a screen surface layer comprising a plurality of light-emitting pixels including a plurality of red pixels, a plurality of green pixels and a plurality of blue pixels; a transducer layer comprising a plurality of acoustic transducers, wherein the transducer layer is affixed below the screen surface layer; and a cover layer having a plurality of cylinder-shaped perforations, wherein the cover layer is affixed above the screen surface layer. In addition, an average "transducer model" describing a phasor distribution in space may be produced describing the output signal at the carrier frequency in the air at a known spatial offset from an averaged transducer. Further, phased array systems may have numerous individual transducer elements that will likely fail before the product incorporating the transducers reaches end-of-life. By detecting such failed transducers, the transducer array may function at peak performance by working around the missing transducer output.

15 Claims, 3 Drawing Sheets

(51) Int. Cl.
  *H04R 3/12*   (2006.01)
  *H04R 17/00*  (2006.01)
  *G06F 3/01*   (2006.01)
  *G08B 6/00*   (2006.01)

(52) U.S. Cl.
  CPC .............. *H04R 3/12* (2013.01); *H04R 17/00* (2013.01); *G08B 6/00* (2013.01); *H04R 17/005* (2013.01); *H04R 2201/401* (2013.01)

(56) References Cited

U.S. PATENT DOCUMENTS

| | | | |
|---|---|---|---|
| 4,881,212 | A | 11/1989 | Takeuchi |
| 5,329,682 | A | 7/1994 | Thurn |
| 5,426,388 | A | 6/1995 | Flora et al. |
| 5,511,296 | A | 4/1996 | Dias |
| 6,503,204 | B1 | 1/2003 | Sumanaweera et al. |
| 6,647,359 | B1 | 11/2003 | Verplank |
| 6,772,490 | B2 | 8/2004 | Toda |
| 6,800,987 | B2 | 10/2004 | Toda |
| 7,109,789 | B2 | 9/2006 | Spencer |
| 7,225,404 | B1 | 5/2007 | Zilles et al. |
| 8,279,193 | B1 | 10/2012 | Birnbaum |
| 8,607,922 | B1 | 12/2013 | Werner |
| 8,884,927 | B1 | 11/2014 | Cheatham, III |
| 9,208,664 | B1 | 12/2015 | Peters et al. |
| 9,612,658 | B2 | 4/2017 | Subramanian |
| 9,841,819 | B2 | 12/2017 | Carter |
| 9,945,818 | B2* | 4/2018 | Ganti .................... G01N 29/09 |
| 2002/0149570 | A1 | 10/2002 | Knowles |
| 2003/0024317 | A1 | 2/2003 | Miller |
| 2003/0144032 | A1 | 7/2003 | Brunner et al. |
| 2004/0014434 | A1 | 1/2004 | Haardt |
| 2004/0091119 | A1 | 5/2004 | Duraiswami et al. |
| 2004/0226378 | A1 | 5/2004 | Oda |
| 2004/0264707 | A1 | 12/2004 | Yang |
| 2005/0212760 | A1 | 9/2005 | Marvit |
| 2006/0085049 | A1 | 4/2006 | Cory et al. |
| 2006/0091301 | A1 | 5/2006 | Trisnadi |
| 2007/0177681 | A1 | 8/2007 | Choi et al. |
| 2008/0012647 | A1 | 1/2008 | Risbo et al. |
| 2008/0273723 | A1 | 11/2008 | Hartung et al. |
| 2008/0300055 | A1 | 12/2008 | Lutnick |
| 2009/0093724 | A1 | 4/2009 | Pemot et al. |
| 2010/0013613 | A1 | 1/2010 | Weston |
| 2010/0085168 | A1 | 4/2010 | Kyung |
| 2010/0103246 | A1 | 4/2010 | Schwerdtner |
| 2010/0109481 | A1 | 5/2010 | Buccafusca |
| 2010/0262008 | A1 | 10/2010 | Roundhill |
| 2011/0051554 | A1 | 3/2011 | Varray et al. |
| 2011/0199342 | A1 | 8/2011 | Vartanian et al. |
| 2011/0310028 | A1 | 12/2011 | Camp, Jr. |
| 2012/0063628 | A1 | 3/2012 | Rizzello |
| 2012/0223880 | A1 | 9/2012 | Birnbaum |
| 2012/0229401 | A1 | 9/2012 | Birnbaum et al. |
| 2012/0299853 | A1 | 11/2012 | Dagar |
| 2012/0307649 | A1 | 12/2012 | Park et al. |
| 2012/0315605 | A1 | 12/2012 | Cho |
| 2013/0035582 | A1 | 2/2013 | Radulescu |
| 2013/0100008 | A1 | 4/2013 | Marti |
| 2013/0101141 | A1 | 4/2013 | McElveen |
| 2014/0168091 | A1 | 6/2014 | Jones |
| 2014/0265572 | A1 | 9/2014 | Siedenburg |
| 2015/0006645 | A1 | 1/2015 | Oh |
| 2015/0007025 | A1 | 1/2015 | Sassi |
| 2015/0066445 | A1 | 3/2015 | Harris et al. |
| 2015/0070147 | A1 | 3/2015 | Cruz-Hernandez et al. |
| 2015/0070245 | A1 | 3/2015 | Han et al. |
| 2015/0110310 | A1 | 4/2015 | Minnaar |
| 2015/0013023 | A1 | 5/2015 | Harris et al. |
| 2015/0130323 | A1 | 5/2015 | Harris |
| 2015/0168205 | A1 | 6/2015 | Lee |
| 2015/0192995 | A1* | 7/2015 | Subramanian .......... G06F 3/016 340/407.1 |
| 2015/0220199 | A1 | 8/2015 | Wang |
| 2015/0226537 | A1 | 8/2015 | Schorre |
| 2015/0226831 | A1 | 8/2015 | Nakamura et al. |
| 2015/0248787 | A1 | 9/2015 | Abovitz |
| 2015/0277610 | A1 | 10/2015 | Kim |
| 2015/0304789 | A1 | 10/2015 | Babayoff |
| 2016/0044417 | A1 | 2/2016 | Clemen |
| 2016/0124080 | A1 | 5/2016 | Carter |
| 2016/0189702 | A1 | 6/2016 | Blanc et al. |
| 2016/0242724 | A1 | 8/2016 | Lavallee |
| 2016/0246374 | A1 | 8/2016 | Carter |
| 2016/0249150 | A1 | 8/2016 | Carter et al. |
| 2016/0320843 | A1 | 11/2016 | Long |
| 2017/0004819 | A1 | 1/2017 | Ochiai |
| 2017/0018171 | A1 | 1/2017 | Carter |
| 2017/0123499 | A1 | 5/2017 | Eid |
| 2017/0193768 | A1 | 7/2017 | Long |
| 2017/0193823 | A1 | 7/2017 | Jiang |
| 2018/0361174 | A1 | 12/2018 | Radulescu |

FOREIGN PATENT DOCUMENTS

| | | |
|---|---|---|
| CN | 103984414 A | 8/2014 |
| EP | 1911530 A1 | 4/2008 |
| GB | 2464117 | 4/2010 |
| GB | 2513884 | 11/2014 |
| GB | 2530036 | 3/2016 |
| JP | 2010109579 | 5/2010 |
| JP | 2011172074 | 9/2011 |
| JP | 201248378 | 3/2012 |
| JP | 2016035646 | 3/2016 |
| KR | 20120065779 | 6/2012 |
| KR | 20130055972 | 5/2013 |
| KR | 20160008280 | 1/2016 |
| WO | 1991/18486 | 11/1991 |
| WO | 96/39754 | 12/1996 |
| WO | 2005/017965 | 2/2005 |
| WO | 2013/179179 | 12/2013 |
| WO | 2014181084 | 11/2014 |
| WO | 2015/039622 | 3/2015 |
| WO | 2016007920 | 1/2016 |
| WO | 2016132141 A1 | 8/2016 |
| WO | 2016132144 | 8/2016 |
| WO | 2016132144 A1 | 8/2016 |
| WO | 2016/162058 | 10/2016 |

OTHER PUBLICATIONS

Hasegawa, K. and Shinoda, H. (2013) "Aerial Display of Vibrotactile Sensation with High Spatial-Temporal Resolution using Large Aperture Airbourne Ultrasound Phased Array", University of Tokyo.

Hoshi, T. et al. (2010), "Noncontrast Tactile Display Based on Radiation Pressure of Airbourne Ultrasound ", IEEE Transactions on Haptics, vol. 3, No. 3.

Yoshino, K. and Shinoda, H. (2013), "Visio Acoustic Screen for Contactless Touch Interface with Tactile Sensation", University of Tokyo.

Kamakura, T. and Aoki, K. (2006) "A Highly Directional Audio System using a Parametric Array in Air" WESPAC IX 2006.

Alexander, J. et al. (2011), "Adding Haptic Feedback to Mobile TV".

Carter, T. et al. (2013) "Ultrahaptics: Multi-point Mid-Air Haptic Feedback for Touch Surfaces" UIST.

Gavrilov, L.R. (2008) "The Possibility of Generating Focal Regions of Complex Configurations in Application to the Problems of Stimulation of Human Receptor Structures by Focused Ultrasound" Acoustical Physics, vol. 54, No. 2, pp. 269-278.

Search Report for GB1308274.8 dated Nov. 11, 2013.

Search Report for PCT/GB2014/051319 dated Jul. 28, 2014.

Gavrilov L R Et al (2000) "A theoretical assessment of the relative performance of spherical phased arrays for ultrasound surgery" Ultrasonics, Ferroelectrics, and Frequency Control, IEEE Transactions on (vol. 47, Issue: 1), pp. 125-139.

Mingzhu Lu et al. (2006) Design and experiment of 256-element ultrasound phased array for noninvasive focused ultrasound surgery, Ultrasonics, vol. 44, Supplement, Dec. 22, 2006, pp. e325-e330.

(56) References Cited

OTHER PUBLICATIONS

E.S. Ebbini et al. (1991), A spherical-section ultrasound phased array applicator for deep localized hyperthermia, Biomedical Engineering, IEEE Transactions on (vol. 38 Issue: 7), pp. 634-643.
Iwamoto et al. (2006), Two-dimensional Scanning Tactile Display using Ultrasonic Radiation Pressure, Symposium of Haptic Interfaces for Virtual Environment and Teleoperator Systems, pp. 57-61.
Iwamoto et al. (2008), Non-contact Method for Producing Tactile Sensation Using Airborne Ultrasound, EuroHaptics, pp. 504-513.
Search report for PCT/GB2015/052578 dated Oct. 26, 2015.
IPRP for PCT/GB2014/051319 dated Nov. 10, 2015.
Search Report for GB1415923.0 dated Mar. 11, 2015.
Marshall, M ., Carter, T., Alexander, J., & Subramanian, S. (2012). Ultratangibles: creating movable tangible objects on Interactive tables. In Proceedings of the 2012 ACM annual conference on Human Factors in Computing Systems. (pp. 2185-2188).
Obrist et al., Talking about Tactile Experiences, CHI 2013, Apr. 27-May 2, 2013.
Long et al. Rendering Volumetric Haptic Shapes in Mid-Air using Ultrasound, ACM Transactions on Graphics (Proceedings of SIGGRAPH Asia), vol. 33, No. 6, Article 181.
Freeman et al., Tactile Feedback for Above-Device Gesture Interfaces: Adding Touch to Touchless Interactions ICMI'14, Nov. 12-16, 2014, Istanbul, Turkey.
Obrist et al., Emotions Mediated Through Mid-Air Haptics, CHI 2015, Apr. 18-23, 2015, Seoul, Republic of Korea.
Wilson et al., Perception of Ultrasonic Haptic Feedback on the Hand: Localisation and Apparent Motion, CHI 2014, Apr. 26-May 1, 2014, Toronto, Ontario, Canada.
Phys.org, Touchable Hologram Becomes Reality, Aug. 6, 2009, by Lisa Zyga.
Iwamoto et al., Airborne Ultrasound Tactile Display: Supplement, The University of Tokyo 2008.
Hoshi, T., Development of Aerial-Input and Aerial-Tactile-Feedback System, IEEE World Haptics Conference 2011, p. 569-573.
EPSRC Grant summary EP/J004448/1 (2011).
Hoshi, T., Handwriting Transmission System Using Noncontact Tactile Display, IEEE Haptics Symposium 2012 pp. 399-401.
Takahashi, M. et al., Large Aperture Airborne Ultrasound Tactile Display Using Distributed Array Units, SICE Annual Conference 2010 p. 359-62.
Hoshi, T., Non-contact Tactile Sensation Synthesized by Ultrasound Transducers, Third Joint Eurohaptics Conference and Symposium on Haptic Interfaces for Virtual Environment and Teleoperator Systems 2009.
Tom Nelligan and Dan Kass, Intro to Ultrasonic Phased Array.
Light, E.D., Progress in Two Dimensional Arrays for Real Time Volumetric Imaging, 1998.
Casper et al., Realtime Control of Multiple-focus Phased Array Heating Patterns Based on Noninvasive Ultrasound Thermography, IEEE Trans Biomed Eng. Jan. 2012; 59(1): 95-105.
Hoshi, T., Touchable Holography, SIGGRAPH 2009, New Orleans, Louisiana, Aug. 3-7, 2009.
Sylvia Gebhardt, Ultrasonic Transducer Arrays for Particle Manipulation.
Marshall et al., Ultra-Tangibles: Creating Movable Tangible Objects on Interactive Tables, CHI'12, May 5-10, 2012, Austin, Texas.
Marzo et al., Holographic acoustic elements for manipulation of levitated objects, Nature Communications DOI: 10.1038/ncomms9661 (2015).
Search report and Written Opinion of ISA for PCT/GB2015/050417 dated Jul. 8, 2016.
Search report and Written Opinion of ISA for PCT/GB2015/050421 dated Jul. 8, 2016.
Martinez-Graullera et al., 2D array design based on Fermat spiral for ultrasonic imaging, Ultrasonics 50 (2010) 280-89.
A. Sand, Head-Mounted Display with Mid-Air Tactile Feedback, Proceedings of the 21st ACM Symposium on Virtual Reality Software and Technology, Nov. 13-15, 2015.
M. Toda, New Type of Matching Layer for Air-Coupled Ultrasonic Transducers, IEEE Transactions on Ultrasonics, Ferroelectrics, and Frequency Control, vol. 49, No. 7, Jul. 2002.
E. Bok, Metasurface for Water-to-Air Sound Transmission, Physical Review Letters 120, 044302 (2018).
Search Report for PCT/GB/2017/053880 dated Mar. 21, 2018.
Search Report for PCT/GB/2017/053729 dated Mar. 15, 2018.
M. A.B. Andrade, Matrix method for acoustic levitation simulation, IEEE Transactions on Ultrasonics Ferroelectrics and Frequency Control, 58 n. 8 (2011).
M. Barmatz, Acoustic radiation potential on a sphere in plane, cylindrical, and spherical standing wave of fields, J. Acoustical Socirty, 77 No. 3 (1985).
Yang Ling, Phase-coded approach for controllable generation of acoustical vortices, J. Applied Physics 113, no, 15 (2013).
K. Jia, Dynamic properties of micro-particles in ultrasonic transportation using phase-controlled standing waves, J. Applied Physics 116, n. 16 (2014).
Xin Cheng et al., Computation of the Acoustic Radiation Force on a Sphere Based on the 3-D FDTD Method, IEEE Symposium 2010.
Xu Hongyi et al, "6-DoF Haptic Rendering Using Continuous Collision Detection between Points and Signed Distance Fields", IEEE Transactions on Haptics, IEEE, USA, vol. 10, No. 2, ISSN 1939-1412, (20160927), pp. 151-161, (20170616).
Péter Tamás Kovács et al, "Tangible Holographic 3D Objects with Virtual Touch", Interactive Tabletops & Surfaces, ACM, 2 Penn Plaza, Suite 701 New York NY 10121-0701 USA, (20151115), ISBN 978-1-4503-3899-8, pp. 319-324.
Search report for PCT/US2018/028966 dated Jul. 13, 2018 (43 pages).
Search report for PCT/GB2018/051061 dated Sep. 26, 2018 (17 pages).
EPO Office Action for EP16708440.9 dated Sep. 12, 2018 (7 pages).
Search Report for PCT/GB2017/050012 dated Jun. 8, 2017.
Search Report for PCT/GB2017/052332 dated Oct. 10, 2017.
International Preliminary Report on Patentability for Application No. PCT/EP2017/069569 dated Feb. 5, 2019, 11 pages.
Japanese Office Action (with English language translation) for Application No. 2017-514569, dated Mar. 31, 3019, 10 pages.
Notice of Allowance dated May 30, 2019 for U.S. Appl. No. 15/966,213 (pp. 1-9).
Office Action dated Apr. 18, 2019 for U.S. Appl. No. 16/296,127 (pp. 1-6).
Office Action dated Apr. 4, 2019 for U.S. Appl. No. 15/897,804 (pp. 1-10).
Office Action dated May 16, 2019 for U.S. Appl. No. 15/396,851 (pp. 1-7).
Steve Guest et al., "Audiotactile interactions in roughness perception", Exp. Brain Res (2002) 146:161-171, DOI 10.1007/s00221-002-1164-z, Received: Feb. 9, 2002/Accepted: May 16, 2002/Published online: Jul. 26, 2002, Springer-Verlag 2002, (11 pages).
Notice of Allowance dated Dec. 19, 2018 for U.S. Appl. No. 15/665,629 (pp. 1-9).
Notice of Allowance dated Dec. 21, 2018 for U.S. Appl. No. 15/983,864 (pp. 1-7).
Ex Parte Quayle Action dated Dec. 28, 2018 for U.S. Appl. No. 15/966,213 (pp. 1-7).
International Preliminary Report on Patentability and Written Opinion issued in corresponding PCT/US2017/035009, dated Dec. 4, 2018, 8 pages.
Notice of Allowance dated Feb. 7, 2019 for U.S. Appl. No. 15/851,214 (pp. 1-7).
Lang, Robert, "3D Time-of-Flight Distance Measurement with Custom Solid-State Image Sensors in CMOS/CCD—Technology", A dissertation submitted to Department of EE and CS at Univ. of Siegen, dated Jun. 28, 2000, 223 pages.
Gokturk, et al., "A Time-of-Flight Depth Sensor-System Description, Issues and Solutions," Published in: 2004 Conference on Computer Vision and Pattern Recognition Workshop, Date of Conference: Jun. 27-Jul. 2, 2004, 9 pages.
Li, Larry, "Time-of-Flight Camera—An Introduction," Texas Instruments, Technical White Paper, SLOA190B—Jan. 2014 Revised May 2014, 10 pages.

(56) References Cited

OTHER PUBLICATIONS

Teixeira, et al., "A brief introduction to Microsoft's Kinect Sensor," Kinect, 26 pages., retrieved Nov. 2018.
Zeng, Wejun, "Microsoft Kinect Sensor and Its Effect," IEEE Multimedia, Apr.-Jun. 2012, 7 pages.
Kolb, et al., "Time-of-Flight Cameras in Computer Graphics," Computer Graphics forum, vol. 29 (2010), No. 1, pp. 141-159.
Iddan, et al., "3D Imaging in the Studio (And Elsewhwere . . . " Apr. 2001, 3DV systems Ltd., Yokneam, Isreal, www.3dvsystems.com.il, 9 pages.
Krim, et al., "Two Decades of Array Signal Processing Research—The Parametric Approach", IEEE Signal Processing Magazine, Jul. 1996, pp. 67-94.
Schmidt, Ralph, "Multiple Emitter Location and Signal Parameter Estimation" IEEE Transactions of Antenna and Propagation, vol. AP-34, No. 3, Mar. 1986, pp. 276-280.
Meijster, A., et al., "A General Algorithm for Computing Distance Transforms in Linear Time," Mathematical Morphology and its Applications to Image and Signal Processing, 2002, pp. 331-340.
Colgan, A., "How Does the Leap Motion Controller Work?" Leap Motion, Aug. 9, 2014, 10 pages.
Definition of "Interferometry"according to Wikipedia, 25 pages., Retrieved Nov. 2018.
Definition of "Multilateration" according to Wikipedia, 7 pages., Retrieved Nov. 2018.
Definition of "Trilateration"according to Wikipedia, 2 pages., Retrieved Nov. 2018.
"Welcome to Project Soli" video, https://atap.google.com/#project-soli Accessed Nov. 30, 2018, 2 pages.
Sixth Sense webpage, http://www.pranavmistry.com/projects/sixthsense/ Accessed Nov. 30, 2018, 7 pages.
Damn Geeky, "Virtual projection keyboard technology with haptic feedback on palm of your hand," May 30, 2013, 4 pages.
Takahashi Dean: "Ultrahaptics shows off sense of touch in virtual reality", Dec. 10, 2016 (Dec. 10, 2016), XP055556416, Retrieved from the Internet: URL: https://venturebeat.com/2016/12/10/ultrahaptics-shows-off-sense-of-touch-in-virtual-reality/ [retrieved on Feb. 13, 2019] 4 pages.
PCT Partial International Search Report for Application No. PCT/GB2018/053404 dated Feb. 25, 2019, 13 pages.
Corrected Notice of Allowability dated Jun. 21, 2019 for U.S. Appl. No. 15/966,213 (2 pages).
International Search Report and Written Opinion for Application No. PCT/GB2018/053739, dated Jun. 4, 2019, 16 pages.
Notice of Allowance dated Jul. 31, 2019 for U.S. Appl. No. 15/851,214 (pp. 1-9).
Notice of Allowance dated Jul. 31, 2019 for U.S. Appl. No. 16/296,127 (pp. 1-9).
Office Action dated Jul. 10, 2019 for U.S. Appl. No. 15/210,661 (pp. 1-12).
Office Action dated Jul. 26, 2019 for U.S. Appl. No. 16/159,695 (pp. 1-8).

\* cited by examiner

ACOUSTIC TRANSDUCERS IN HAPTIC SYSTEMS

RELATED APPLICATION

This application claims the benefit of the following two U.S. Provisional Patent Applications, all of which are incorporated by reference in their entirety:
1) Ser. No. 62/351,621, filed on Jun. 17, 2016; and
2) Ser. No. 62/370,955, filed on Aug. 4, 2016.

FIELD OF THE DISCLOSURE

The present disclosure relates generally to improved calibration techniques for acoustic transducers in haptic-based systems.

BACKGROUND

A continuous distribution of sound energy, referred to as an "acoustic field", may be used for a range of applications including parametric audio and the levitation of objects.

By defining one or more control points in space, the acoustic field can be controlled. Each point may be assigned a value equating to a desired amplitude at the control point. A physical two-dimensional array of transducers may then be controlled to create an acoustic field exhibiting the desired amplitude at the control points. This may be achieved by actuating the set of transducers as a phased array. Focusing the energy in the desired control point location implies the transducers are excited at different times such that the waves output from each arrive together.

To achieve this in a controlled manner, the output from each transducer must be determined at the desired location. To fully specify the required input signal to the transducers and the output signal in the air, the input and output signals are assumed to be close enough to monochromatic waves over short timescales to each be modeled as a monochromatic wave. Thus, the modeled signals consist of an unchanging sine wave that approximates the intended transducer input and output. Unchanging sine waves may be specified exactly by complex values. For a given input signal, the response of a point in air is given by dividing the output complex value (modelling the signal at the point in air) by the input complex value (modelling the signal input to the transducer). This assumes that the transducer may be modelled linearly. The map of such complex values or phasors through all space around the transducer may be described as a "transducer model".

In order to create these effects above an interactive surface (which may comprise a visible screen) acoustic waves must be induced volumetrically in the space above the surface. This is problematic as existing screen and interactive surface technologies are not acoustically permeable. This leads to solutions in which integration with mid-air haptic technology extends only to placing a transducer array around the outer edge of the surface.

But this "active bezel" approach limits the level of acoustic control that can be obtained in the center of the surface. This problem becomes exaggerated as screen size increases. Further, the cost, bulk and added complexity of creating an array around the edge of a surface are all problems that limit the uptake and scope of mid-air haptic technology.

It would therefore be commercially advantageous to ameliorate or eliminate these obstacles by designing screen technologies with structures that allow this haptic-based functionality.

Furthermore, many in-air transducers that could be used to create an acoustic field exhibiting the desired amplitude at the control points are available as off-the-shelf components. Because the primary purpose of these components is range finding, they often have little or no calibration. This means that while often such devices have a polarity (that is, depending on which way they are connected their phasor response may be inverted unintentionally), the polarity is not marked or indicated on the electronic component. Thus, individual calibration of such devices may be necessary. Further, in all transducers, even those produced specifically for this use case, small deviations in the offset of the complex phasor from the input signal is not addressed. This can differ on a transducer-to-transducer basis and require a per-unit calibration. This may include variations in amplitude across devices, as again compensation for such differences are unnecessary when considering the range finding use case.

For each type of transducer, an average "transducer model" describing the phasor distribution in space may be produced describing the output signal at the carrier frequency in the air at a known spatial offset from an averaged transducer. Individual manufacturing variation, however, may cause deviations from this idealized model. This may be due to a variety of factors, including manufacturing tolerance errors in the placement of the individual transducer elements, and/or added covering materials that may modify both the phase and amplitude parts of the phasor. The application of simple modifications to the behavior of the model in software may be used to account for and correct such variations.

Further, all components have limited lifespans. Phased array systems may have potentially hundreds or even thousands of individual transducer elements, many of which will likely fail before the product incorporating the transducers reaches end-of-life. If the calibration can detect such failed, failing or out-of-specification transducers, the transducer array may function at peak performance by working around the missing or incorrect transducer output. Since having a per-device calibration step is an extra expense, any methods of simplifying or automating any such step is of commercial value.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Described herein are certain techniques for improved acoustic transducers in haptic systems. Some or all of these techniques may be used at the same time or one after the other in order to improve such operation.

I. Integrating Acoustic Transducers into Interactive Surfaces

1. Transparent or Invisible Acoustic Transducers

The acoustic elements may be made to be transparent and added on top of the screen surface as an extra layer. This may be achieved by sandwiching multiple thin layers of a transparent conductor, such as indium tin oxide (ITO), with another transparent piezoelectric material such as those based on bismuth titanate. Driving circuitry may also be integrated transparently, by using existing thin film transistor (TFT) technology. Alternatively, the piezoelectric material may be opaque and deposited around the edge of another transparent, light emitting or optically active element or group of elements. By doing this, it is possible to allow this area to vibrate, resulting in an effectively transparent or invisible transducer.

2. Acoustic Transducing Via Dark or Missing Sub-Pixels

Another method to create transducers is to fabricate some of the pixels in a screen as transducers instead of optically-active pixels. The driving technology for transducers is similar to that used when driving pixels. In this case, it is important to consider the photometric response of the eye and the effects on sub-pixel rendering techniques when allotting how to pattern pixels that emit or transport light alongside acoustically transducing sub-pixels. Since the eye is less sensitive to high frequency light, for balanced display color, pixels toward the blue end of the spectrum should be larger for the best effect.

Figure 1:
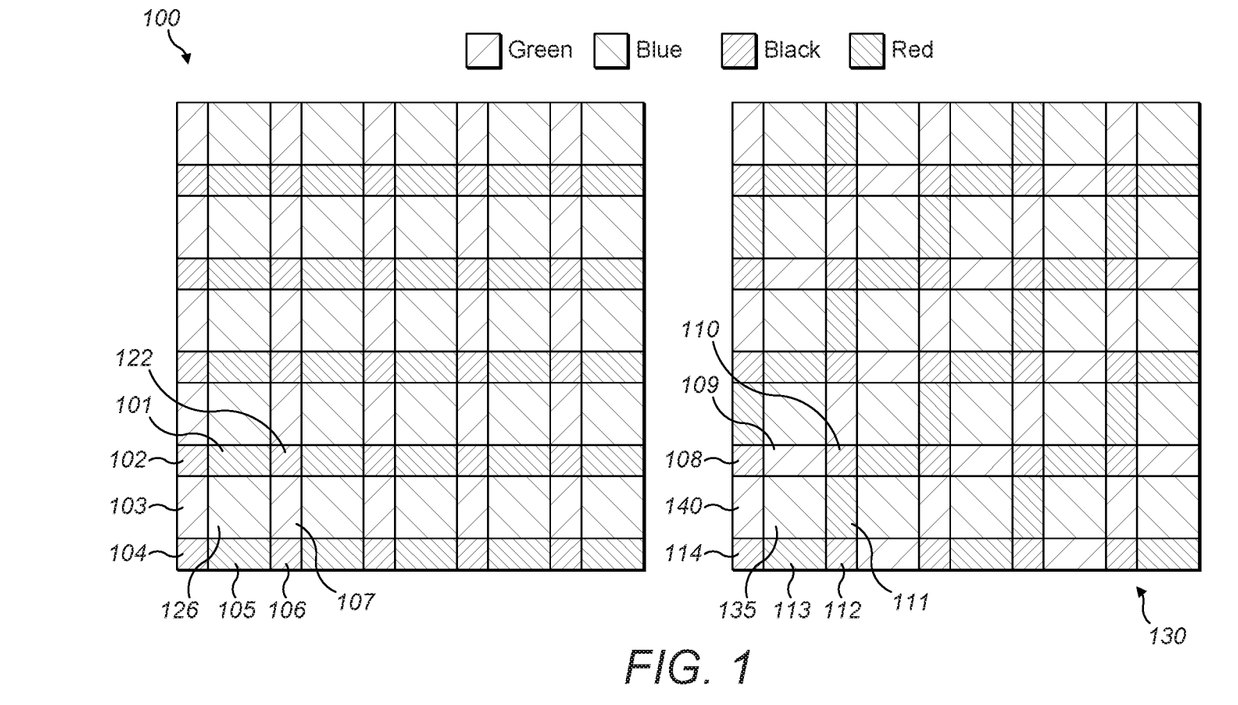
FIG. 1 shows possible pixel layouts for an integrating acoustic transducers into interactive surfaces.

With a large number of actuating elements, the size of individual elements may be reduced due to the nature of the acoustic field required from the array. Therefore, each transducer may be small at a similar density to that of the pixels. This suggests that one way to pattern a pixel is to fabricate as RGBT (red/green/blue/[ultrasonic] transducer) in a square, where the sub-pixel dividing line is not central, as shown in FIG. 1. Red and green may be alternated in order to preserve the luminance of single pixel horizontal and vertical lines. This can also be fabricated as a hole structure due to the planar construction of the electrodes, creating RGBH (red/green/blue/[through] hole), in order to allow sound energy through from a transducer that is instead mounted below the pixel layer of the screen.

As an alternative to one hole per pixel, holes may be cut through sub-pixels to allow acoustic energy through the holes. By utilizing optical total internal reflection, this may serve to increase the perceived brightness of sub-pixels at this location. Another approach is to use a passive phase changing meta-material in the screen to create natural focusing of the acoustic waves. This may be achieved by fabricating a layer consisting of pre-arranged tortuous paths or labyrinthine structures and then sandwiching this between layers perforated to match the meta-material geometry. These meta-material layers may lie either on top of or underneath pixel layers.

Turning to FIG. 1, shown a first layout 100 for RGBH/RGBT pixel distributions. The first layout 100 shows holes 102, 104, 106, 122 interspersed among red pixels 101, 105, green pixels 103, 107 and blue pixel 126. (The holes may not be to scale in order to simplify control lines and optimize light and acoustic output.) In this layout the red pixels 101, 105 face each other and the green pixels 103, 107 face each other and surround the blue pixel 120. The blue pixel 120 is the larger pixel in the center for balanced display color. This pixel arrangement is repeated throughout the first layout 100.

Also in FIG. 1, shown is a second layout 130 for RGBH/RGBT pixel distributions. The second layout 130 shows holes 108, 110, 112, 114 interspersed among red pixels 111, 113, green pixels 109, 140 and blue pixel 135. (The holes may not be to scale in order to simplify control lines and optimize light and acoustic output.) In this layout the red pixels 111, 113 are adjacent to the green pixels 109, 140 and surround the blue pixel 135. The blue pixel 135 is the larger pixel in the center for balanced display color. This pixel arrangement is repeated throughout the second layout 130. The difference between the second layout 130 and the first layout 100 is the way in which the pattern repeats. Unlike the first layout 100, in the second layout 130 the green and red lines are distributed diagonally across the array. In other words, the horizontal pixels alternate red and green as eye moves up and down the array. The vertical pixels do the same as the eye moves left and right across the array.

Figure 2:
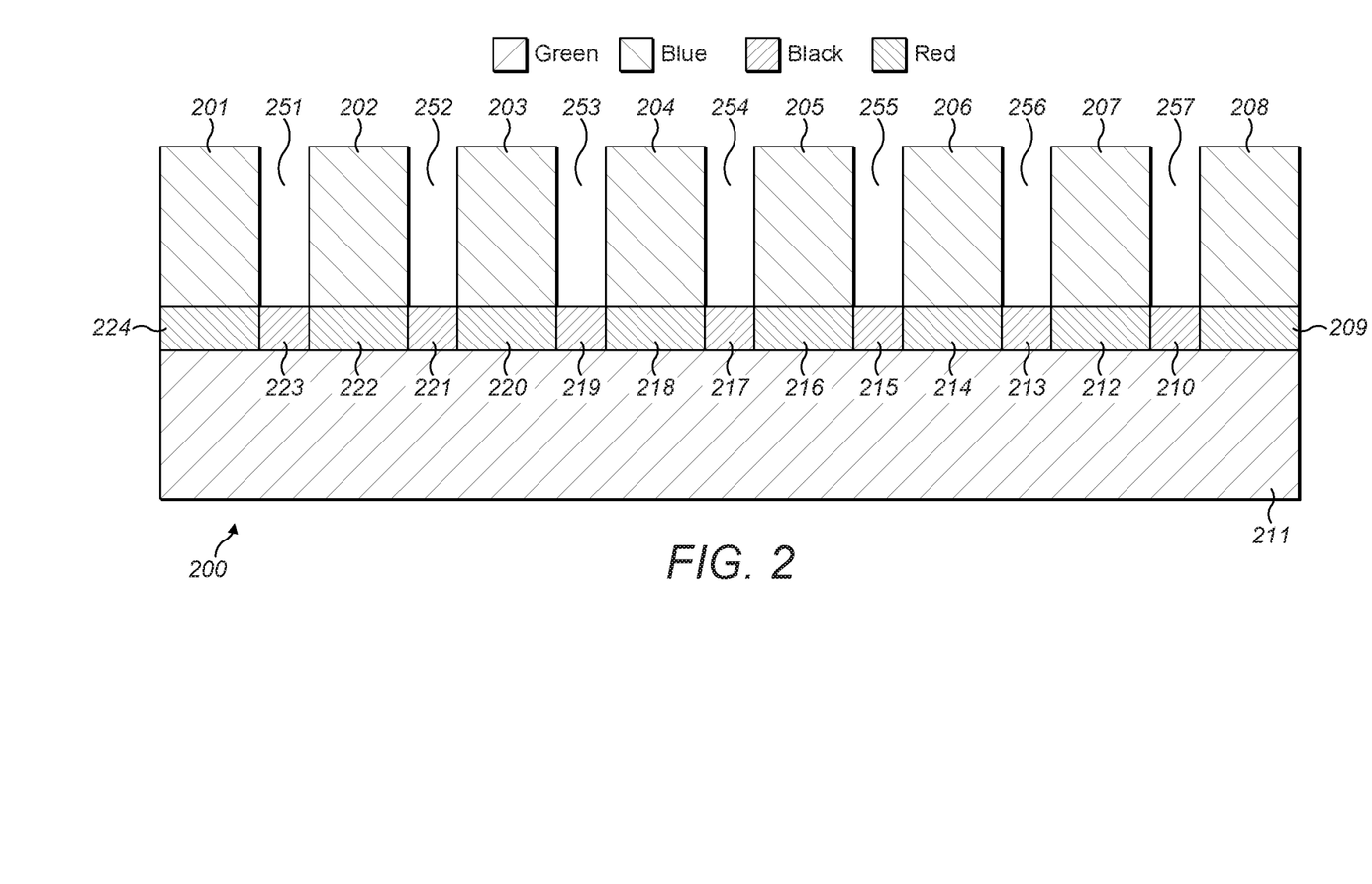
FIG. 2 shows regular cylindrical perforations in a system with integrated acoustic transducers in interactive surfaces.

Above the pixel structure is typically a cover glass to protect the pixels from scratches and contamination. In order to allow the ultrasound pass through, perforations must be made at regular intervals. FIG. 2 demonstrates one arrangement of a cover glass 200 with perforations. The image in FIG. 2 represents a side on view of the pixel array with a glass layer on top (whereas the images in FIG. 1 represented a top-down view). In FIG. 2, the blue is the glass (with gaps for the holes), the red squares are the RGB pixels, the black squares are the transducer in RGBT or the hole in RGBH. The green is a backing substrate in RGBT or a transducer/transducer array in RGBH.

Specifically, in FIG. 2, a blue glass substrate 201, 202, 203, 204, 205, 206, 207, 208 is the glass or film cover over a red base of pixels 224, 222, 220, 218, 216, 214, 212, 209 with perforations 251, 252, 253, 254, 255, 256, 257 directly above the black which in this case represent acoustic transducers 223, 221, 219, 217, 215, 213, 210. The green substrate 211 is either backing for the pixel array or an acoustically active element in which case the black regions 223, 221, 219, 217, 215, 213, 210 are themselves holes for sound in addition to the open white areas.

FIG. 2 shows regular cylindrical perforations 251, 252, 253, 254, 255, 256, 257 which could be laser cut or drilled. If sized correctly they may allow ultrasound to pass through without attenuation. Viewing angles would be affected as these holes would be visible at non-zero viewing angles. In order to minimize this effect, the glass thickness should be as small as is feasible. In some arrangements, this distortion at non-zero viewing angles could serve as a privacy filter.

Figure 3:
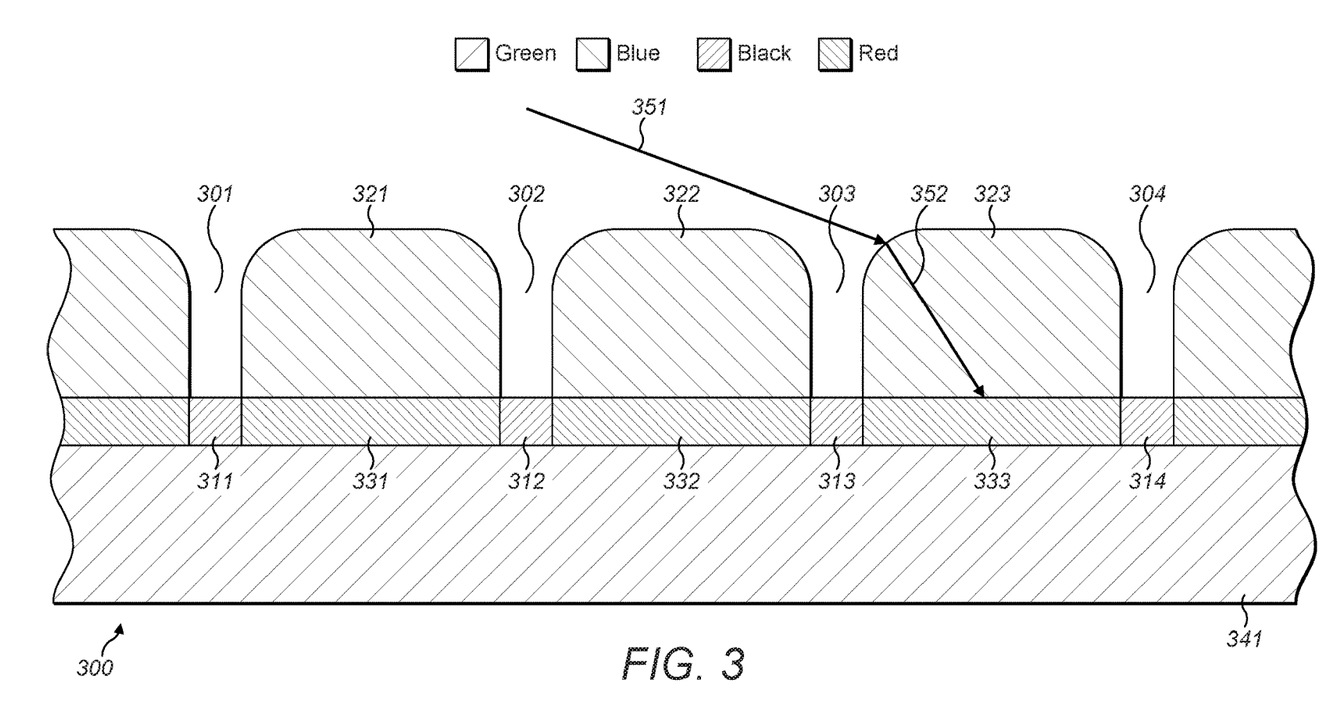
FIG. 3 shows cylindrical perforations with curved elements in a system with integrated acoustic transducers into interactive surfaces.

FIG. 3 demonstrates another arrangement of a cover glass 300 with curved perforations. The image in FIG. 3 represents a side on view of the pixel array with a glass layer on top (whereas the images in FIG. 1 represented a top-down view). In FIG. 3, the blue is the glass (with gaps for the holes), the red squares are the RGB pixels, the black squares are the transducer in RGBT or the hole in RGBH. The green is a backing substrate in RGBT or a transducer/transducer array in RGBH.

Specifically, FIG. 3 shows is a cover glass 300 with curved openings. A blue glass substrate 321, 322, 323 is the cover glass or film which is seated on a red base of pixels 331, 332, 333 but modified to include features (such as curved openings) that improve the acoustic output. The perforations 301, 302, 303, 304 are directly above the black acoustic transducer 311, 312, 313, 314. The green substrate 341 is either backing for the pixel array or an acoustically active element in which case the black regions are themselves holes for sound as well in addition to the open white areas. Black arrows 351, 352 represent a light ray which would otherwise connect with the cylinder region of the perforation and is now directed into a light pixel therefore masking the distortion that would be caused by the cylinder.

FIG. 3 thus shows a modification to the cover glass perforations which include a curved element 321, 322, 323 at the opening. This curvature serves multiple purposes. First, the horn-shape of the opening may serve as an acoustic impedance matching element, thus increasing the output of the acoustic elements. Second, the horn shape of the opening serves to mask large-angle distortion caused by the cylindrical regions of the perforations. Third, the control of the angle of incidence of light to and from the pixel may be used to create a glasses-free 3D display.

II. ABX Mapping and Automated Calibration

1. ABX Mapping

All acoustic transducers have polarity. There are two possible polarities for an acoustic transducer. One of these polarities is correct and will produce the correct signal, whereas the other polarity produces an inverted waveform. For a substantially monochromatic input signal this behaves as an apparent phase shift of $\pi$ radians. Thus, for the same substantially monochromatic input signal, a given pair of transducers may produce sound waves that are out of phase, often by $\pi$ radians.

In cases where the transducer polarity is not marked by the manufacturer and not taken into consideration at the hardware assembly phase, transducers in an array may have a randomized distribution of polarity. The output of a transducer can be measured with a microphone and its phase determined.

True phase delays also exist, wherein manufacturing variability generates offsets in input to output timings. These are generally small, much less than $\pi$ radians, Thus, they are easily seen as separate from the effects of polarity change and often can be ignored.

For an array of transducers $\{t_1, \ldots, t_n\}$ it is possible to measure the polarity of each transducer and apply an offset to the input signal to each transducer in software such that every transducer in the array acts as if they had the same polarity. This correcting phase shift does not address the underlying transducer polarity, rather it is just necessary for all transducers to behave as though they have the same polarity.

Therefore, it is desirable to take $t_1$ to be the reference transducer and make all others match. One method to do this is to have all transducers in the array be driven with the same, synchronized signal. A microphone $m_1$ is placed at a set spatial offset from $t_1$. For example, this could be at a distance of 2 mm along the z-axis of the transducer. If the signal received by $m_1$ indicates that there is no output from $t_1$ then an 'X' is recorded and another transducer must be used as the reference. Otherwise, 'A' is recorded for $t_1$.

A second microphone $m_2$ is placed at the same spatial offset from $t_2$. The two microphones must themselves have the same polarity. (Transducers may be used as microphones provided their polarity has been tested and they have been wired to have the same polarity.) The signals received by $m_1$ and $m_2$ are compared. This could be achieved using an oscilloscope for example. If the two signals are in phase, an 'A' is recorded for $t_2$, representing a zero-phase offset. If the two signals are out of phase, 'B' is recorded representing a $\pi$ radians phase offset. If the signal received by $m_2$ indicates that there is no output from $t_2$, an 'X' is recorded.

The second microphone, $m_2$, is then moved to each of the remaining transducers through $t_n$ at the same spatial offset repeating the process and recording 'A', 'B' or 'X' for each. These labels are collated in a table in software that is the calibration data for the array. When solving for an acoustic field, these labels correspond to a complex activation for the transducer: 1 for an 'A' (normal phase), -1 for a 'B' (opposite normal phase) and 0 for an 'X' (unresponsive transducer). Thus, the varying polarities of the transducers are accounted for. In addition, the algorithms are able to take unresponsive transducers into account in their computation.

2. Automated Transducer Calibration

As the array of transducers of unknown polarity is connected, each transducer may be pulsed to determine its output. This can then be received by a microphone and compared against a transducer model in order to determine: 1) whether the output is shifted in phase compared to the output of the model; or 2) has different output amplitude than the model predicts that an average transducer of a given type should have at a given point in space. Physical jitter or a cover material that promotes further diffraction may also be applied to either the array or the microphone in order to adjust for wavelength interference effects within the transducer such as those similar to the amplitude changes induced by a multipole antenna. This is because a transducer may have amplitude zeroes in their output at some spatial locations. While this may only be hypothetically zero, it may still result in reduced signal-to-noise ratio in calibration measurements. Rather than having a simple ABX map, a complex valued phasor mapping may be built up that allows arrays to use complex-valued coefficients that pre-multiply the coefficients used when building models of the transducers. This enables much finer granular control of the activation of the transducers and the eventual model tailored to each transducer. In so doing, the true phase delays and amplitude variations due to manufacturing variability may be taken into account and the prediction of more accurate output is achieved.

A large set of samples of parts or the whole of the array may also be used for calibration. This may be achieved by for instance moving the microphone, moving the transducer array, moving an acoustic reflector or modifying an interacting material with known acoustic properties while taking measurements. If the array is powered on continuously using a known set of input signals, a regression may be used to compute the complex coefficients required to transform each input signal to the received signal. The acoustic model for the average transducer may be extracted from the system as a linear effect, leaving only the electronic properties of the individual transducers.

III. Conclusion

The various features of the foregoing embodiments may be selected and combined to produce numerous variations of improved haptic systems.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An apparatus comprising:
a screen surface layer comprising a plurality of light-emitting pixels including a plurality of red pixels, a plurality of green pixels and a plurality of blue pixels;
a transducer layer comprising a plurality of acoustic transducers and generating an acoustic field, wherein the transducer layer is affixed below the screen surface layer;
a cover layer having a plurality of cylinder-shaped perforations, wherein the cover layer is affixed above the screen surface layer;
wherein the perforations are arranged such that the acoustic field transmitted through the perforations to air above the screen surface layer is not substantially attenuated; and
wherein the perforations and the light-emitting pixels are arranged such that images produced by the screen surface layer are not substantially distorted by the perforations.

2. The apparatus as in claim 1 wherein each of the plurality of cylinder-shaped perforations is located just above each of the plurality of acoustic transducers.

3. The apparatus as in claim 2 wherein the top of each of the plurality of cylinder-shaped perforations has a curved opening.

4. The apparatus as in claim 2, wherein the plurality of blue pixels are larger than the plurality of red pixels and the plurality of green pixels.

5. The apparatus as in claim 2, wherein the plurality of acoustic transducers are approximately the same size as the plurality of red pixels and the plurality of green pixels.

6. The apparatus as in claim 2 further comprising a meta-material layer of labyrinthine structures.

7. An apparatus, comprising:
a screen surface layer;
a layer of a plurality of transparent acoustic transducers on top of the screen surface layer;
wherein the layer of a plurality of transparent acoustic transducers comprises a plurality of opaque piezoelectric materials and wherein each of the plurality of opaque piezoelectric materials is adjacent to optically active elements.

8. The apparatus as in claim 7 wherein the layer of a plurality of transparent acoustic transducers comprises a transparent conductor and a transparent piezoelectric material.

9. The apparatus as in claim 8 wherein the layer of a plurality of transparent acoustic transducers further comprises transparent driving circuitry.

10. An apparatus comprising:
a screen surface layer comprising:
i) a plurality of light-emitting pixels including a plurality of red pixels, a plurality of green pixels and a plurality of blue pixels; and ii) a plurality of acoustic transducers, wherein the plurality of blue pixels, the plurality of red pixels, the plurality of green pixels and the plurality of acoustic transducers are in approximately the same plane; and
a cover glass above the screen surface layer having perforations with horn-shaped openings;
wherein the perforations and the plurality of light-emitting pixels are arranged such that images produced by the screen surface layer are not substantially distorted by the perforations.

11. The apparatus as in claim 10, wherein the plurality of blue pixels are larger than the plurality of red pixels and the plurality of green pixels.

12. The apparatus as in claim 11, wherein the plurality of acoustic transducers are approximately the same size as the plurality of red pixels and the plurality of green pixels.

13. The apparatus as in claim 10, further comprising a cover layer having a plurality of perforations, wherein the cover layer is above the screen surface layer.

14. A method of calibrating an array of a plurality of acoustic transducers, comprising:
   a) for each of the plurality of acoustic transducers:
   i) pulsing the acoustic transducer with an acoustic transducer input to create an acoustic transducer output;
   ii) receiving the acoustic transducer output by a reference transducer;
   iii) comparing the acoustic transducer output with a reference transducer output to create acoustic calibration data; and
   iv) applying physical jitter to the acoustic transducer that promotes diffraction to adjust for wavelength interference effects;
   b) creating a complex valued phasor map using the acoustic calibration data from each of the plurality of acoustic transducers.

15. The method as in claim 14, further comprising:
   c) modifying an interacting material with known acoustic properties while taking measurements;
   d) for each of the plurality of acoustic transducers, calculating a regression to compute the complex coefficients required to transform each acoustic transducer input to the acoustic transducer output;
   e) calculating an acoustic model for an average acoustic transducer as a linear effect.

* * * * *